US007962372B2

(12) United States Patent
Leon et al.

(10) Patent No.: US 7,962,372 B2
(45) Date of Patent: Jun. 14, 2011

(54) PRODUCT COMMON OBJECT

(75) Inventors: Maria Theresa Barnes Leon, Fremont, CA (US); Nardo B. Catahan, Jr., S. San Francisco, CA (US); Shailendra Garg, Sunnyvale, CA (US); Shekhar P. Kale, Foster City, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1106 days.

(21) Appl. No.: 11/441,499

(22) Filed: May 26, 2006

(65) Prior Publication Data

US 2006/0271447 A1  Nov. 30, 2006

Related U.S. Application Data

(62) Division of application No. 10/751,008, filed on Dec. 31, 2003.

(60) Provisional application No. 60/457,474, filed on Mar. 24, 2003.

(51) Int. Cl.
*G06Q 30/00* (2006.01)

(52) U.S. Cl. .......... 705/26.1; 705/1; 705/27.1; 345/419; 707/102

(58) Field of Classification Search .............. 705/26, 705/27, 1; 345/419; 707/102
See application file for complete search history.

(56) References Cited

U.S. PATENT DOCUMENTS

| 4,714,995 | A | 12/1987 | Materna et al. ............... 364/200 |
| 5,311,438 | A | 5/1994 | Sellers et al. .................. 700/96 |
| 5,646,862 | A | 7/1997 | Jolliffe et al. .................... 703/1 |
| 6,828,963 | B1 | 12/2004 | Rappoport .................... 345/419 |
| 2003/0213844 | A1* | 11/2003 | Yoshida et al. ............... 235/383 |
| 2004/0039576 | A1 | 2/2004 | He et al. ............................ 705/1 |
| 2007/0214020 | A1* | 9/2007 | Srinivasan et al. ............... 705/4 |

FOREIGN PATENT DOCUMENTS

| DE | 101 50 391 A1 | 5/2002 |
| JP | 2001 256308 | 9/2001 |
| WO | WO 01/88759 A1 | 11/2001 |

OTHER PUBLICATIONS

"Scansoft: Scansoft's new OmniForm Premium 5.0 to offer businesses powerful forms management; Software converts paper forms to digital for easy distribution and accurate data management." M2 Presswire. Coventry: Oct. 16, 2001. Retrieved via Proquest.*
Wilson, Jr., *Aerospace looks for lift form e-commerce*, Intervia Geneva, Jul./Aug. 2001; vol. 56, Issue 655, 6 pages (retrived from ProQuest.com).
*PTC: Siebel Systems and PTC create strategic alliance to leverage entriched ifnormation across product development, sales and service; Combination of Siebel eBusiness Applications and PTC Collaborative Product Development solutions to deliver competitive advantage*, M2 Presswire, Conventry: Jan. 24, 2002, 3 pages (retrived from ProQuest.com).

* cited by examiner

*Primary Examiner* — Michael A. Misiaszek
(74) *Attorney, Agent, or Firm* — Campbell Stephenson LLP

(57) ABSTRACT

Stored product management information in a first format for use by a first computerized system is transformed to readily make the stored product management information available for use in a second computerized system that utilizes a second format in a cost-efficient and time-efficient manner.

6 Claims, 10 Drawing Sheets

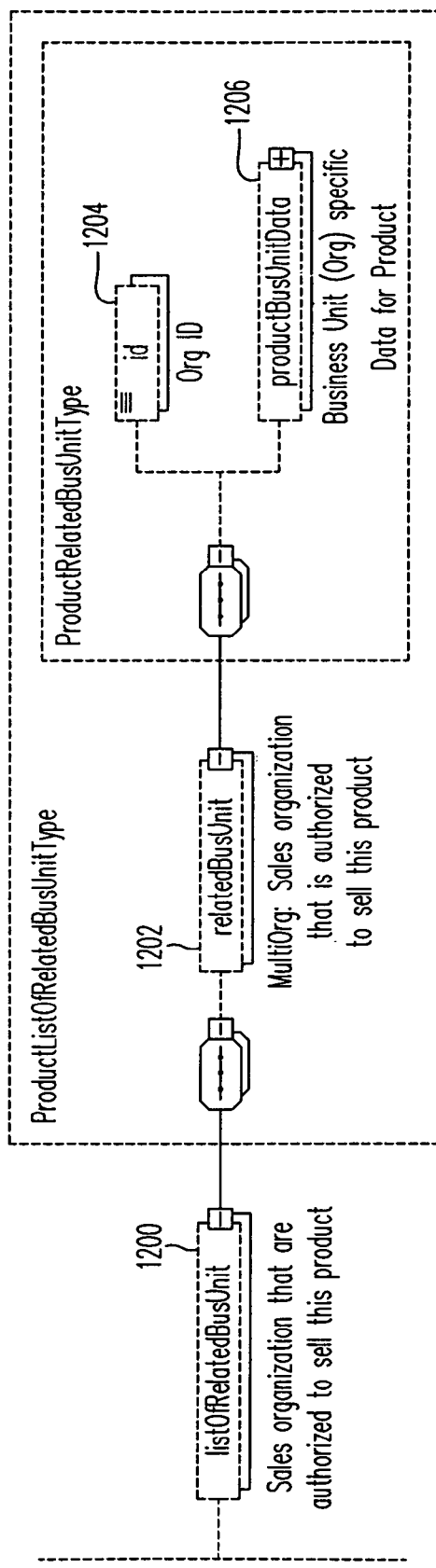
FIG. 12
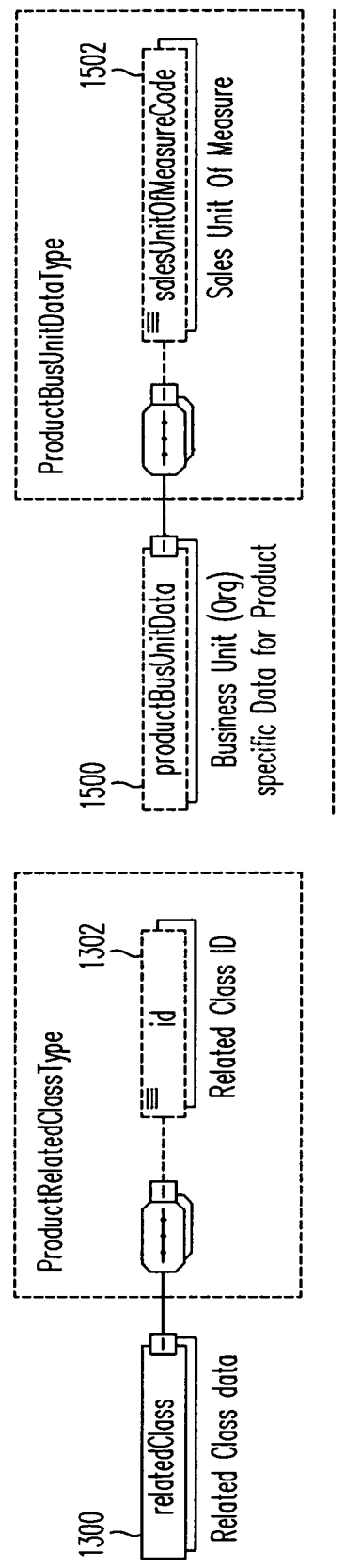
FIG. 15
FIG. 13

PRODUCT COMMON OBJECT

CROSS REFERENCE TO RELATED APPLICATIONS

This application is a divisional of U.S. patent application Ser. No. 10/751,008, filed Dec. 31, 2003, and claims the benefit of U.S. Provisional Patent Application No. 60/457,474 filed Mar. 24, 2003, entitled, "PRODUCT COMMON OBJECT," by Barnes-Leon et al., and which is hereby incorporated by reference in its entirety.

TECHNICAL FIELD

The present invention is directed to the field of data modeling in the context of enterprise resources planning, and more specifically to aspects of product life cycle management.

BACKGROUND

When new products are created or existing products are updated, the associated new and updated product definitions need to be communicated to various sub-processes that make up the product lifecycle management system, which in turn may be part of a multi-application integration system (MAIS).

For example, a front-office for sales and customer service can be treated as the source of all sales related product information. For purposes of explanation, assume that the front-office maintains and defines all sales catalogs, as well as defines bundled product definitions and configurable product definitions. The front-office can use customer feedback either to modify product definitions and requirements or to create new product definitions and requirements. When the new product definitions are created by the front-office, such new product definitions need to be made available in the back-office for engineering design and manufacturing systems. For example, the post sales, service and support activities information gathered by the front-office serve as feedback into the process for defining/analyzing customer requirements for a given product. Such information can be used by the back-office engineering/manufacturing systems to create a better product or improve existing products.

Similarly, the back-office engineering design and manufacturing systems may also initiate new product definitions or modify existing product definitions. For example, the engineers in the back-office may develop a new product. The new product information needs to be made available to the front-office (sales and service department of the company) so that the company can present the latest product offerings to customers.

The users of the front-office software computerized systems typically store data in forms usable by the front-office computerized system, which often differ significantly from the forms usable with back-office computerized systems.

Thus, when some or all aspects of product management are managed by both back-office and front-office computerized systems, there is a need to synchronize the product management information in both computerized systems. Generally, in order for front-office computerized systems to communicate with back-office computerized systems that are already being used, the user must manually regenerate data from the back-office computerized systems in forms usable by the front-office computerized systems, and vice versa. Such manual regeneration has several significant disadvantages, including: (1) it is often expensive; (2) it often requires a substantial amount of time to complete; (3) it must be repeated each time data changes in either the back-office system or the front-office system; and (4) it is prone to errors.

In view of the foregoing, an automated approach for transforming data used by a back-office computerized system for use by a front-office computerized system, and vice versa, is needed.

BRIEF DESCRIPTION OF THE DRAWINGS

FIG. 3 to FIG. 15 are data structure diagrams that illustrate the product common object model, according to certain embodiments.

DETAILED DESCRIPTION

Figure 1A:
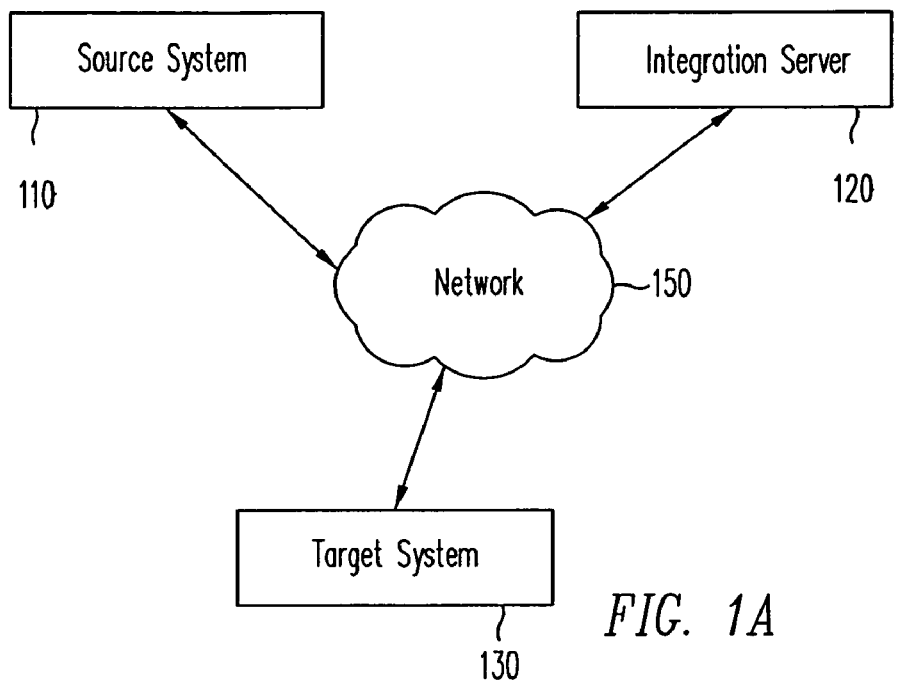
FIG. 1A is a high-level network diagram showing aspects of a computerized environment in which the facility operates, according to certain embodiments.

According to certain embodiments, the synchronization of product management information addresses the needs of a company, which needs result in deploying multiple computer applications, obtained from multiple vendors of computer applications, in the company's product management system. The synchronization operation provides a user of the product management system the same view of the product management information across the various computer applications. All changes in the product management information need to be captured and made accessible to all relevant computer applications in the product management system. Thus, a common data storage model is needed for enabling users in the product management system to have the same view of the product management information across the various computer applications.

For purposes of explanation, assume that a company's product management system includes a front-office system for customer interfacing operations, such as sales, and customer service. Further, assume that the company's product management system also includes a back-office system that includes an engineering design and manufacturing applications, for example. The computer applications of the front-office system uses a data model that is distinct from the data model used in the back-office system's computer applications.

For example, assume that new or updated product management information is created in the front-office based on post sales, service and support activities information gathered by the front-office. Such information can be used by the back-office engineering/manufacturing systems to create a better product or improve an existing product. Thus, a common data storage model is needed so that the various computer applications used by the front-office can share the product management information with the back-office computer applications, and vice versa.

Product management information is not restricted to sales and engineering systems. Product lifecycle management can extend product management information out of engineering and manufacturing into other critical enterprise processes such as those related to planning, price costing, price listing, bill of materials, forecasting, etc.

Thus, when all systems within an enterprise have a consistent and accurate view of the product management information, improvement can be made with respect to the following metrics:

Time-to-Market: This is a key metric that tracks how long it takes for a company to bring a new product to market. In times of increasing competition and pricing pressure, time-to-market is critical in ensuring that a company can maintain a competitive advantage and profitability. Access to accurate product information reduces the time to add new products to sales catalogs, and reduces the time needed to prepare for promotion and sales.

Configuration Accuracy: Configuration accuracy ensures that only the latest and most accurate product information is available at the point of sale or service. For example, if attributes of a product have changed or if a product is obsolete, then such changes would result in a configuration that is valid from the front-office perspective but invalid from a back-office perspective. Access to accurate product information results in a reduction in the cost of updating product configuration information in sales catalogs and in configuration engines.

Timely Orders: Accurate product management information enables buyers to be notified of new product announcements in a timely manner. Further, the timely creation of SKUs for new products allows for the company to accept customer orders for such new products.

Valid Orders: Inaccurate product management information would result in incorrect orders being generated.

A software facility (hereafter "the facility") for automatically converting product management information, is described. In some embodiments, the facility converts product management information from a form used by the source system to a form used by the target system. In certain embodiments, back-office systems are those that provide support for such functions as engineering, design, manufacturing, and financing. In certain embodiments, front-office system are those that provide support for such functions as sales and service to consumers. As previously explained, the flow of product management information may be bidirectional. In other words, product management information can be initiated from either the front-office product management system or from the back-office product management system.

When product management information is passed from the back-office product management system to the front-office product management system, then the back-office product management system is referred to as the source system and the front-office product management system is referred to as the target system. On the other hand, when product management information is passed from the front-office product management system to the back-office product management system, then the front-office product management system is referred to as the source system and the back-office product management system is referred to as the target system.

In some embodiments, such as embodiments adapted for converting product management information in the first source format, the facility converts product management information by converting the product management information that is in the first source format into an intermediate format. The intermediate format is then used to convert the product management information into the target format.

By performing such conversions, embodiments of the facility enable a user of a first computerized system who has stored product management information in a first format for use by the first computerized system to readily make the stored product management information available for use in a second computerized system that utilizes a second format in a cost-efficient and time-efficient manner.

FIG. 1A is a high-level network diagram showing aspects of a typical hardware environment in which the facility operates. FIG. 1A shows a source system 110, a target system 130, an integration server 120 and a network 150. Source system 110 stores product management information in a source format. There may be more than one source system. Target system 130 stores product management information in a target format. There may be more than one target system.

The facility (not shown) converts some or all product management information that is in the source format into the target format by using an intermediate format of the product management information. In certain embodiments, such conversions are performed with the aid of one or more other computer systems, such as integration server system 120. Components of the facility may reside on and/or execute on any combination of these computer systems, and intermediate results from the conversion may similarly reside on any combination of these computer systems.

The computer systems shown in FIG. 1A are connected via network 150, which may use a variety of different networking technologies, including wired, guided or line-of-sight optical, and radio frequency networking. In some embodiments, the network includes the public switched telephone network. Network connections established via the network may be fully-persistent, session-based, or intermittent, such as packet-based. While the facility typically operates in an environment such as is shown in FIG. 1A and described above, those skilled in the art will appreciate the facility may also operate in a wide variety of other environments.

Figure 1B:
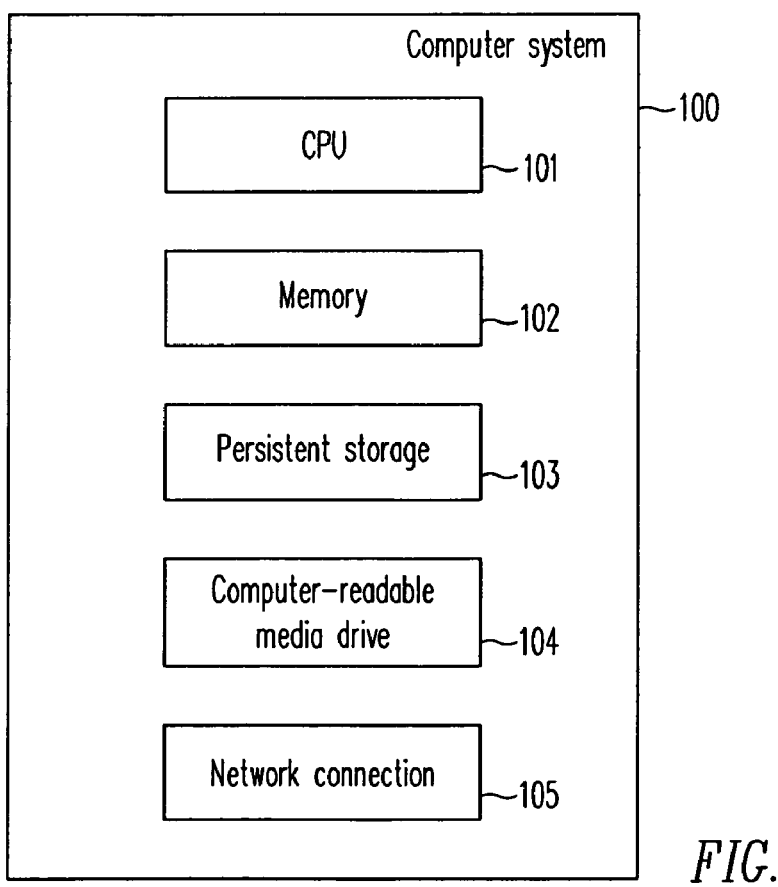
FIG. 1B is a block diagram showing some of the components typically incorporated in at least some of the computer systems and other devices on which the facility executes.

FIG. 1B is a block diagram showing some of the components typically incorporated in at least some of the computer systems and other devices on which the facility executes, including some or all of the server and client computer systems shown in FIG. 1A. These computer systems and devices 100 may include one or more central processing units ("CPUs") 101 for executing computer programs; a computer memory 102 for storing programs and data—including data structures—while they are being used; a persistent storage device 103, such as a hard drive, for persistently storing programs and data; a computer-readable media drive 104, such as a CD-ROM drive, for reading programs and data stored on a computer-readable medium; and a network connection 105 for connecting the computer system to other computer systems, such as via the Internet, to exchange programs and/or data—including data structures. While computer systems configured as described above are typically used to support the operation of the facility, those skilled in the art will appreciate that the facility may be implemented using devices of various types and configurations, and having various components.

It will be understood by those skilled in the art that the facility may transform product management information from a number of different source systems and from a number of different source software packages to a number of target systems and/or to a number of target software packages.

Figure 2:
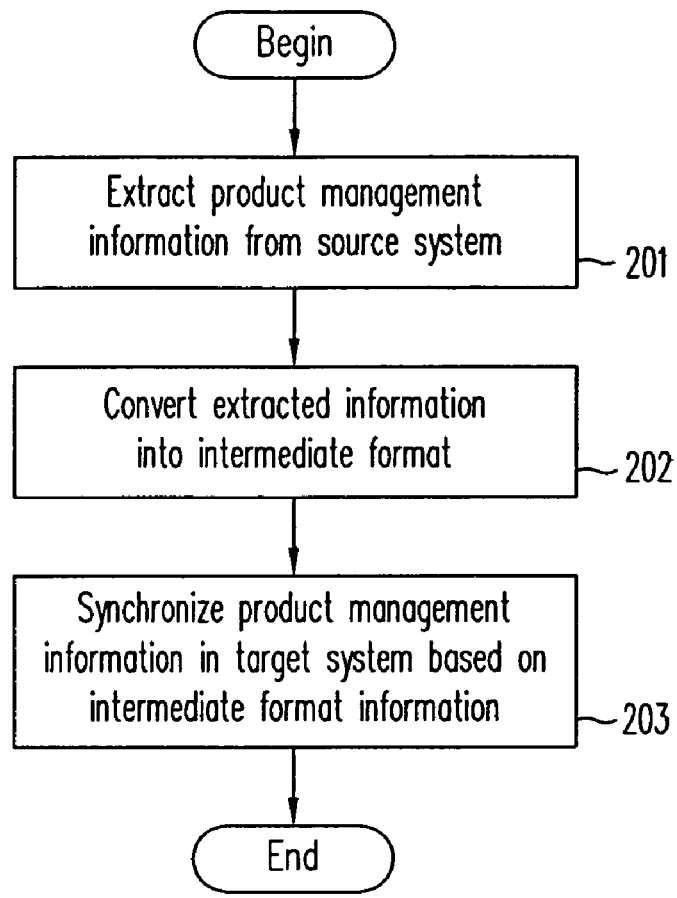
FIG. 2 is a high-level flow diagram that shows some steps performed by the facility.

FIG. 2 is a high-level flow diagram that shows some steps typically performed by the facility in order to convert product management information from one or more source formats to the target format. At block 201, the facility extracts product management information from one or more source systems. At block 202, the facility converts the extracted information into an intermediate format. The intermediate format is described in greater detail herein, with reference to the common object data model. At block 203, the facility synchronizes the product management information from the source system with that of the target system by converting the product management information in intermediate format into the target format. After block 203, the steps as shown in FIG. 2 conclude.

The common object data model for product management may include some or all of the following information, according to certain embodiments:

Product Name
Product Part Number
Product Description
Product Identifier (different from product name)
Organization
Vendor Name
Vendor Part Number
Vendor Organization
Inventory Organization
Class
Attribute
Other service Information
Product Type
Unit of Measure
Effective Start Date
Effective End Date
Orderable
Saleable
Lead Time
Substitute Product
Related Product
Equivalent Product
Equivalent Product Primary Organization
Equivalent Product Vendor
Equivalent Product Vendor Organization
Class Name
Lead Time
Maximum Quantity
Minimum Quantity
Orderable Flag
Sales Product Flag
Serialized Product
Service Product
Ship Carrier
Shipping Via
Units in Inventory
Units in Inventory As Of a Certain Date The common object data model for product management is herein referred to as a product common object model. FIG. 3 to FIG. 15 are data structures of the product common object model associated with product management. Such a product common object model illustrates sample intermediate data structures produced from corresponding product management information in the source format. The elements and associated sub-elements in the product data structure model as described herein are optional. In other words, the decision to include a given element or sub-element may vary from implementation to implementation. Further, the product common object model is designed to be flexible and thus, the definition of a given element or sub-element may vary form implementation to implementation depending of the needs of the enterprise.

Figure 3:
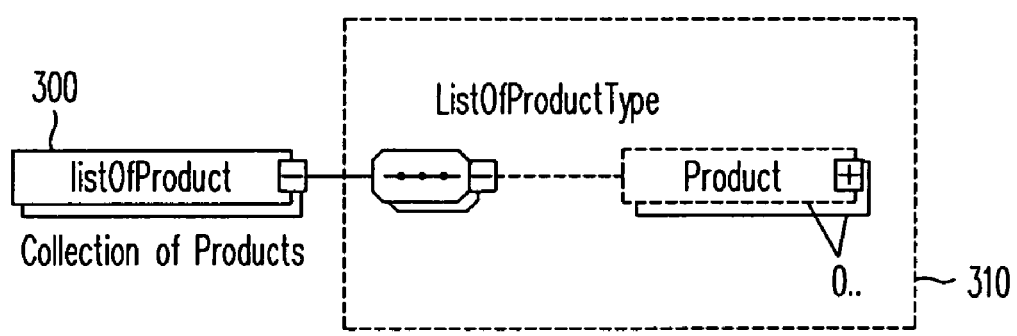

The product common object model as described herein may be adapted and/or extended to represent various products for most industries. Further, the product common object data model may be used to satisfy requirements associated with customer orders, company assets, company business opportunities, product pricing, and product costing, for example:

In FIG. 3, the intermediate data structure used by the facility is represented by a listOfProduct element 300, which may include any number of product elements 310. One such illustrated product element is product element 400 as shown in FIG. 4.

Figure 4:
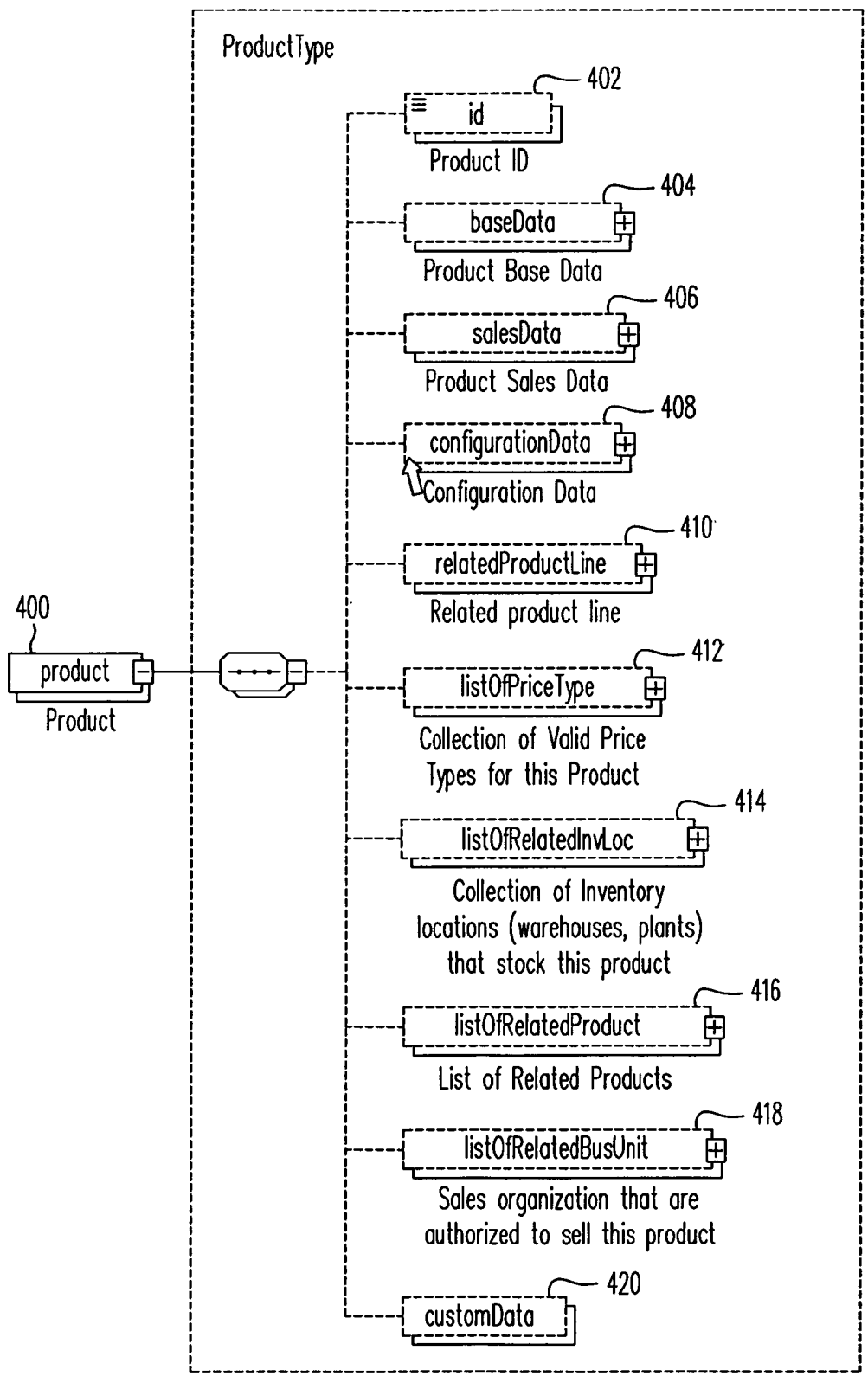

In FIG. 4, product element 400 includes a product identifier (ID) element 402, a product baseData element 404 (contains basic information on the given product), a product salesData element 406 (contains sales information for the given product), a product configurationData element 408 (contains configuration data for the given product), a relatedProductLine element 410 (contains information on the product line that is associated with the given product), a product listOfPriceType element 412 (contains information on valid price types for the given product), a product listOfRelatedInvLoc element 414 (contains information on inventory locations that stock the given product), a listOfRelatedProduct element 416 (contains information on products that are related to the given product), a product listOfRelatedBusUnit element 418 (contains information on sales organizations that are authorized to sell the given product), and a product customData element 420 (contains customized data associated with the given product).

The product baseData element 404 is described in greater detail with reference to FIG. 5. The product salesData element 406 is described in greater detail with reference to FIG. 6. The product configurationData element 408 is described in greater detail with reference to FIG. 7. The relatedProductLine element 410 is described in greater detail with reference to FIG. 8. The product listOfPriceType element 412 is described in greater detail with reference to FIG. 9. The product listOfRelatedInvLoc element 414 is described in greater detail with reference to FIG. 10. The listOfRelatedProduct element 416 is described in greater detail with reference to FIG. 11. The product listOfRelatedBusUnit element 418 is described in greater detail with reference to FIG. 12.

Figure 5:
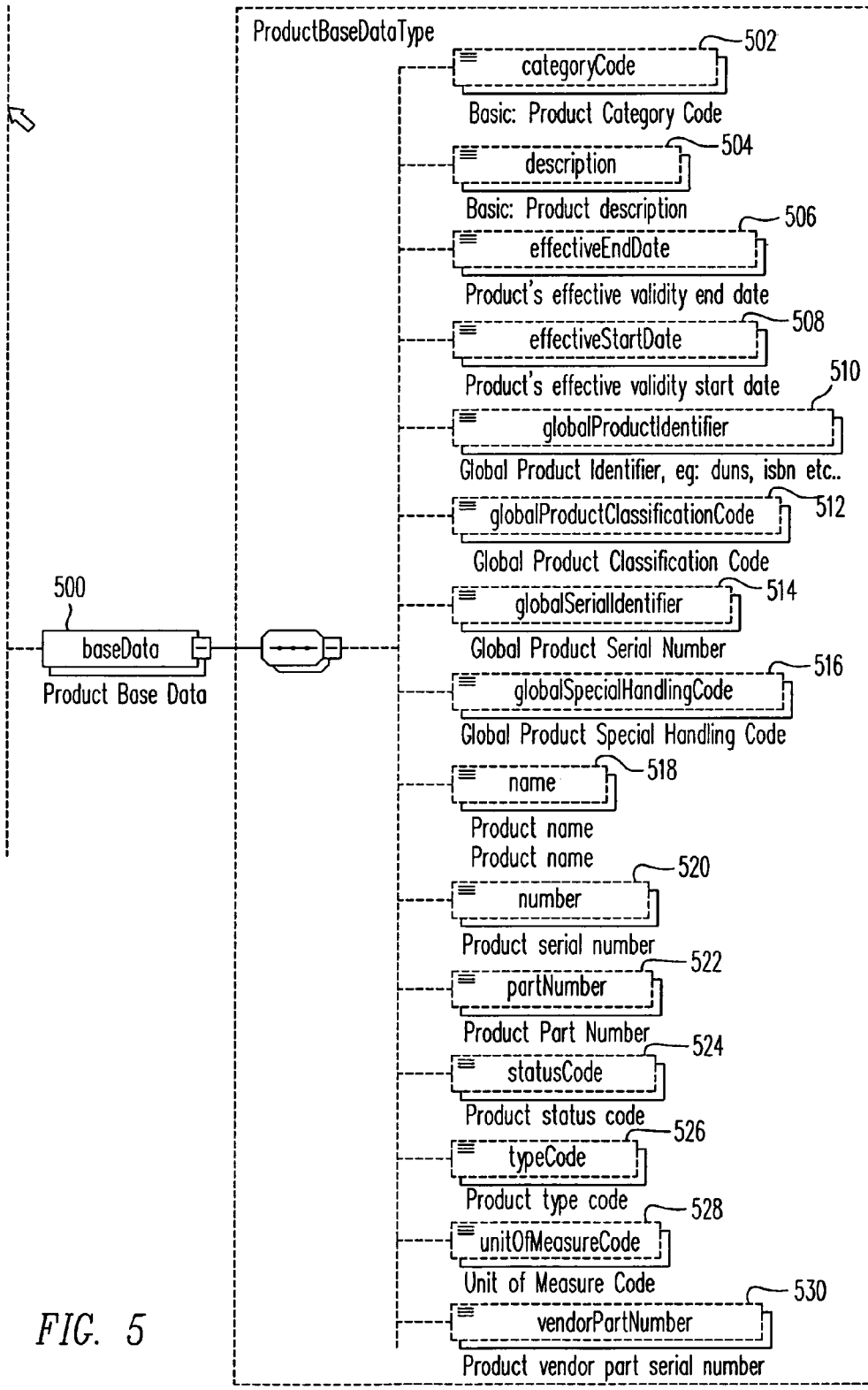

In FIG. 5, the product baseData element 500 includes a product categoryCode element 502 (contains information on the product category code), a product description element 504 (contains product description information), a product effectiveEndDate element 506 (contains information on the product's validity end date), a product effectiveStartDate element 508 (contains information on the product's validity start date), a globalProductIdentifier element 510 (contains information on a global identifier for the given product, such as DUNS, ISBN, etc., which is often used in business-to-business relationships), a globalProductClassificationCode element 512 (contains information on the global classification code for the given product, wherein the global classification code may be set by an international standards body), a product globalSerialIdentifier element 514 (contains information on the global serial number for the given product, if the product is serialized), a product globalSpecialHandlingCode 516 (contains handling instructions for the given product), a product name element 518 (contains the name of the given product), a product number element 520 (contains the serial number of the given product, if the product is serialized), a product partNumber element 522 (contains the part number of the given product), a product statusCode element 524 (contains status information associated with the given product, such as whether support is being phased out for the given product, for example), a product typeCode element 526 (contains type code information associated with the given product, such as savings account, checking account, etc., if the product is a banking service, for example), a product unitOfMeasureCode element 528 (such as kilogram or pound, for example), a product vendorPartNumber element 530 (contains the serial number used by the vendor associated with the given product).

Figure 6:
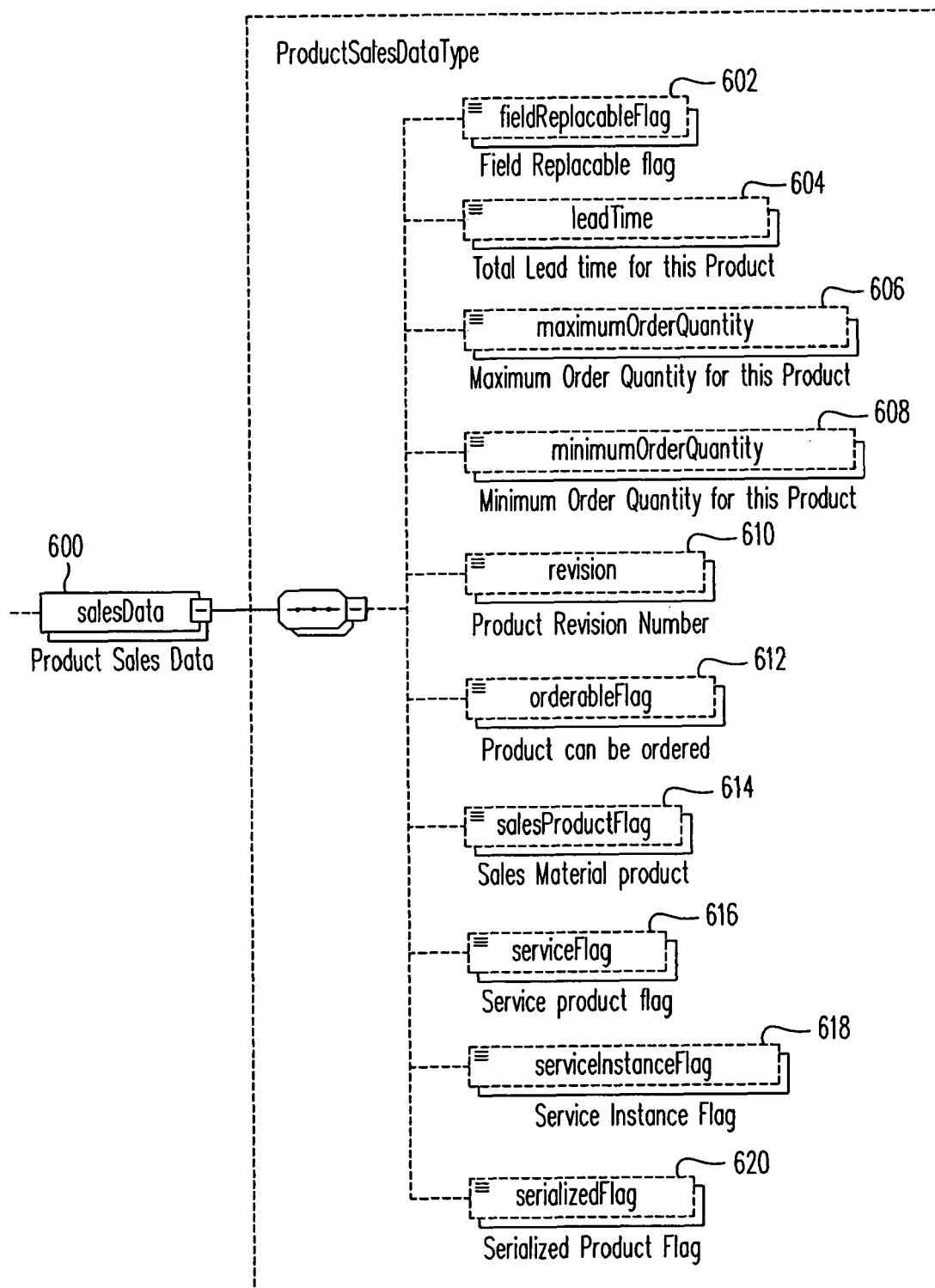

FIG. 6 illustrates various elements that contain information related to sales of the given product, according to certain embodiments. In FIG. 6, the product salesData element 600 includes a product fieldReplaceableFlag element 602, which is a flag that indicates whether the product can be replaced by a field service enigine. The product salesData element 600 includes a product leadTime element 604, which is the lead time that is needed for delivery of the product. Further, the product salesData element 600 includes a product maximumOrderQuantity element 606 (indicates a maximum quantity of the product per customer order), a product minimumOrderQuantity element 608 (indicates a minimum quantity of the product per customer order), a product revision element 610 (indicates a revision number, such as product configuration revision number or product design revision number), and a product orderableFlag element 612 that indicates whether the given product can be ordered or not. For example, a given product may be flagged as unorderable if the given product is being discontinued by the enterprise. The product salesData element 600 also includes a salesProductFlag element 614 (indicates whether the given product is merchandize as opposed to being a service), a product serviceFlag element 616 (indicates whether the given product is a service as opposed to being merchandize), a product serviceInstanceFlag element 618 (indicates whether the given product is a configurable service, such as a warranty service, for example), and a product serializedFlag element 620 (indicates whether the given product is to be serialized).

Figure 7:
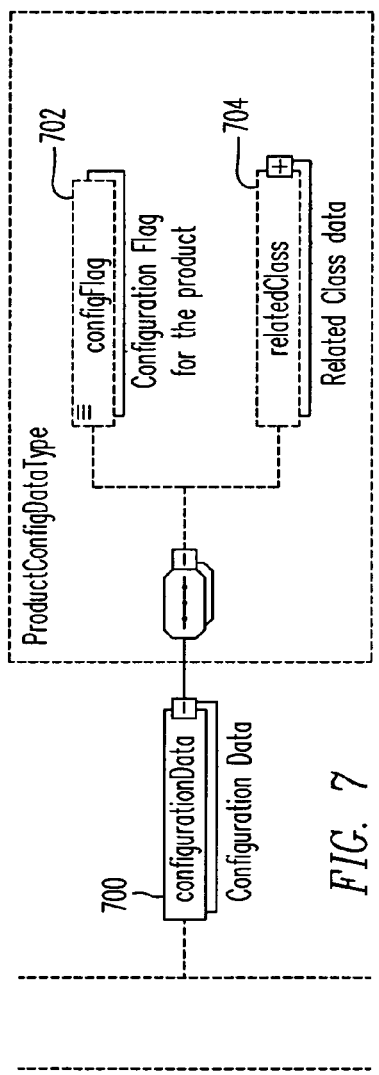

In FIG. 7, product configurationData element 700 includes a product configFlag element 702 (i.e., a configuration flag for the given product), and a product relatedClass element 704, which identifies the class from which configuration data is to be inherited by the given product, according to certain embodiments. The product relatedClass element 704 is described in greater detail herein with reference to FIG. 13.

Figure 8:
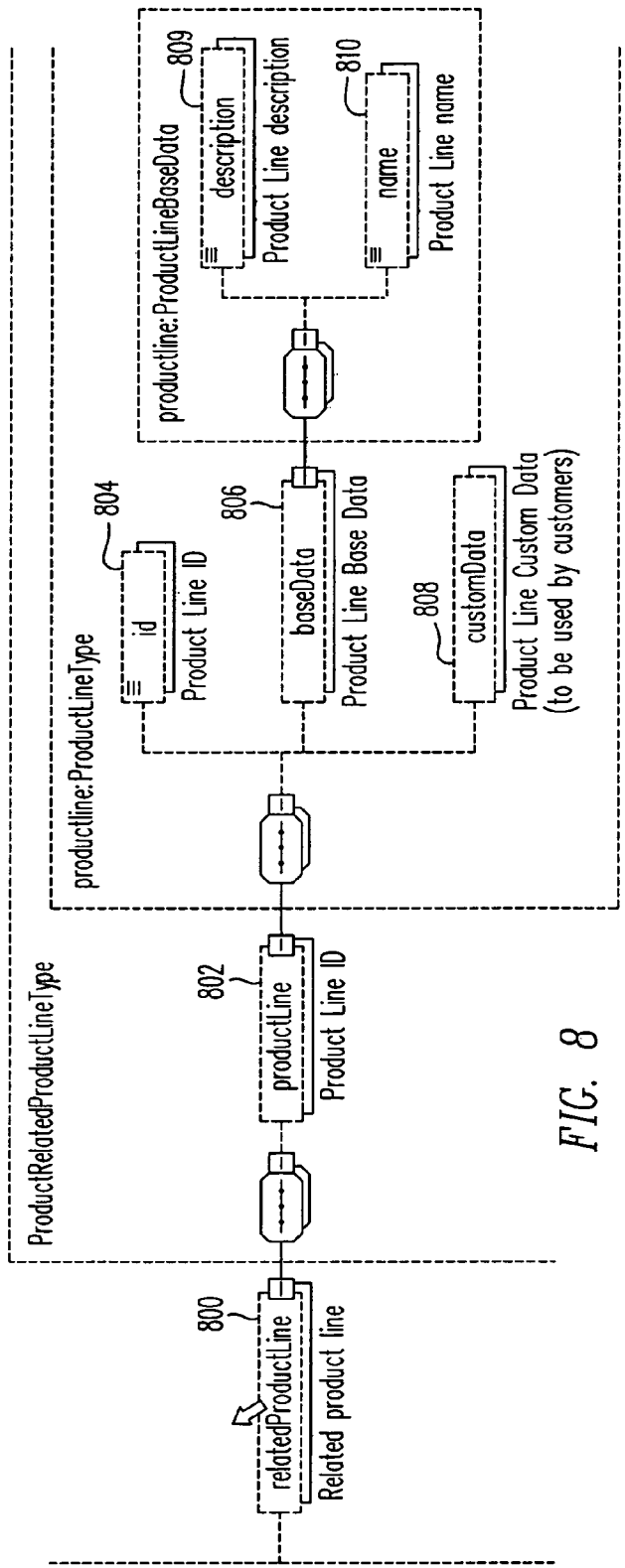

FIG. 8 illustrates some elements that contain information with respect to the product line that is associated with the given product, according to certain embodiments. In FIG. 8, the relatedProductLine element 800 includes a productLine element 802, which contains identification information for identifying the product line associated with the given product. The productLine element 802 includes a product line indentification (ID) element 804, a product line baseData element 806, and a product line customData element 808 (contains any customized data that is associated with the product line). The product line baseData element 806 includes a product line description element 809 and a product line name element 810.

Figure 9:
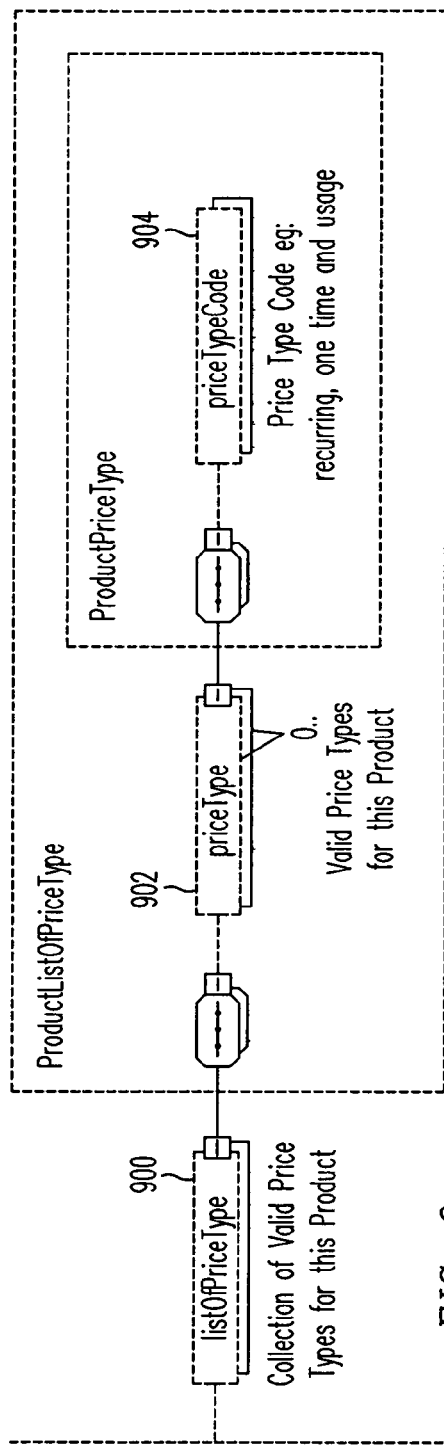

FIG. 9 illustrates some elements that contain information with respect to certain pricing aspects associated with the given product, according to certain embodiments. In FIG. 9, the product listOfPriceType element 900 includes any number of product priceType elements 902 (contains information on the valid price types for the given product). Each product priceType element 902 includes a product priceTypeCode element 904 (examples of price type codes are recurring charges, one-time charge, usage charge, etc.).

Figure 10:
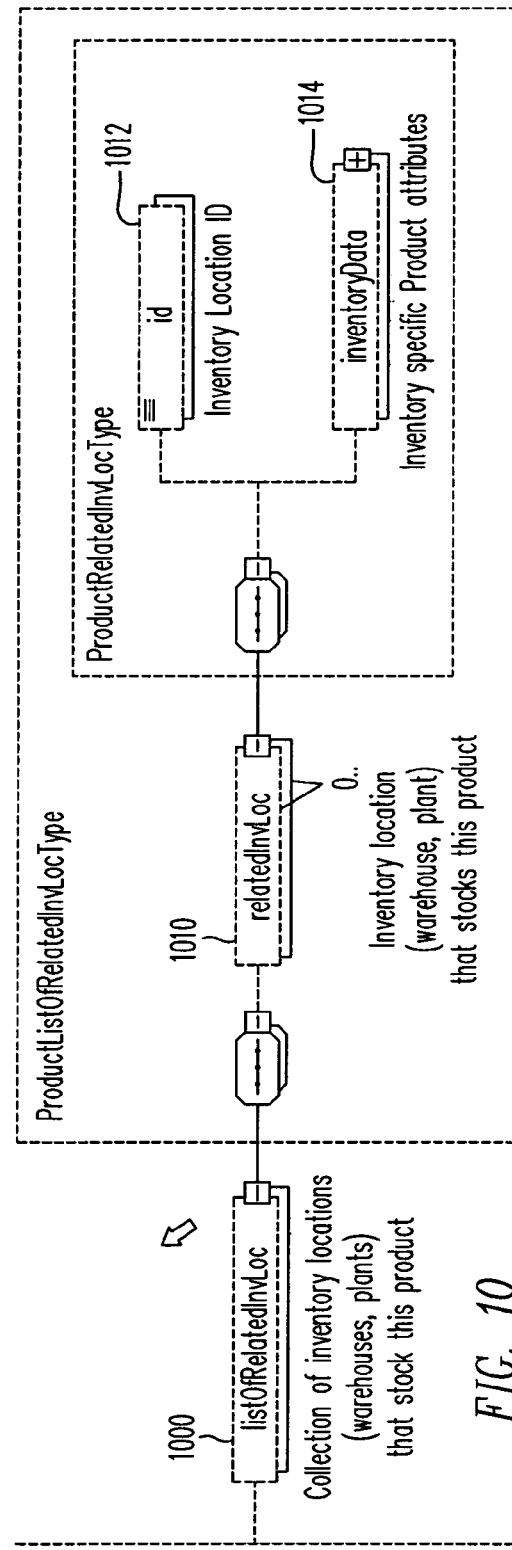

FIG. 10 illustrates some elements that contain information with respect to the inventory locations that stock the given product, according to certain embodiments. There may be multiple locations that stock the given product. In FIG. 10, the product listOfRelatedInvLoc element 1000 includes any number of product relatedInvLoc elements 1010 (contains the information on the inventory locations, such as warehouses or plants, that stock the given product). Each product relatedInvLoc element 1010 includes a product inventory location identification element 1012 (ID for identifying the inventory location for the given product), and an product inventoryData element 1014 (contains information on attributes of the given product in the context of the specific inventory location for the given product). The product inventoryData element 1014 is described in greater detail herein with reference to FIG. 14.

Figure 11:
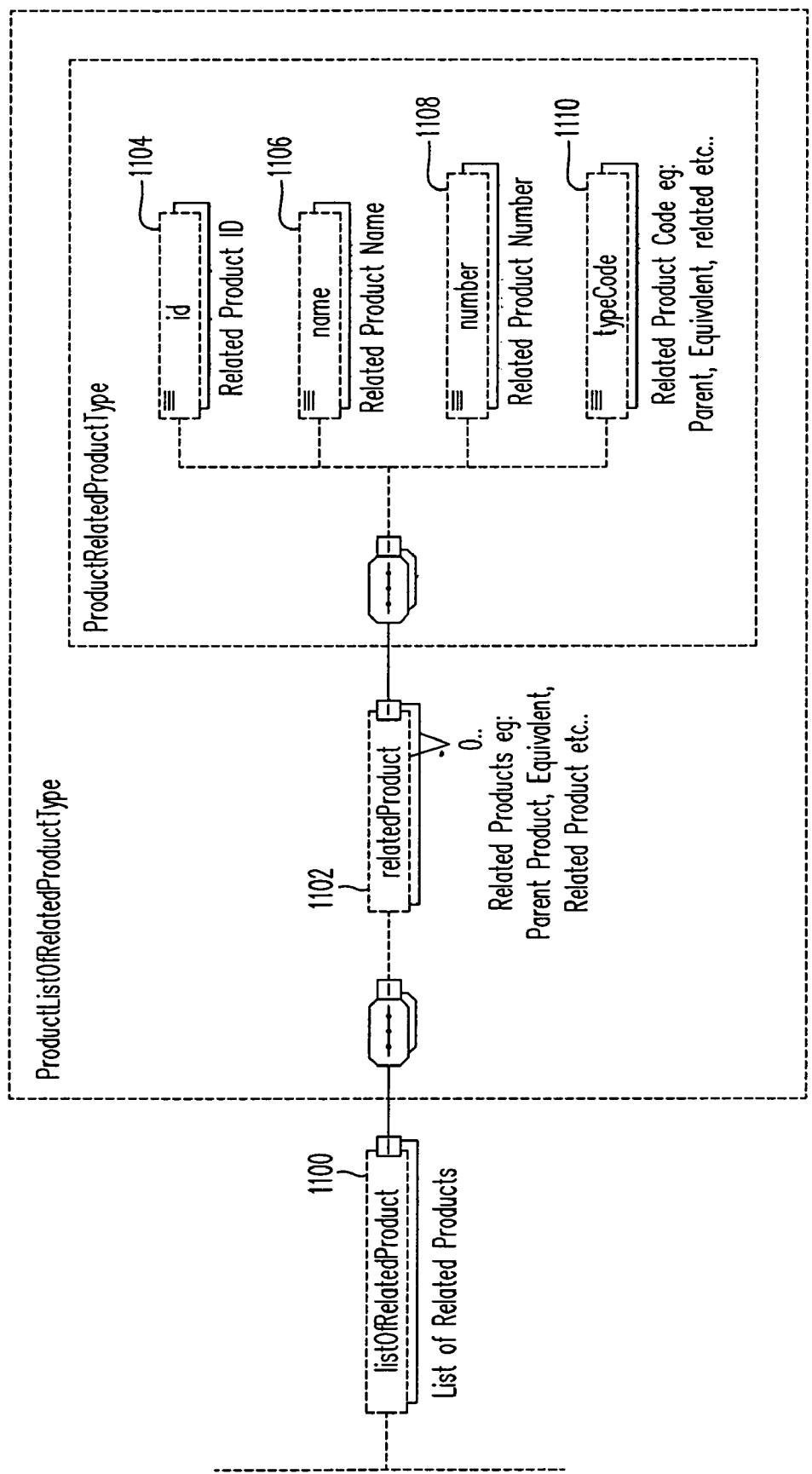

FIG. 11 illustrates some elements that contain information with respect to products that are related to the given product, according to certain embodiments. For example, a related product may be a parent product, an equivalent product, a substitute product, etc. In FIG. 11, the listOfRelatedProduct element 1100 includes any number of relatedProduct elements 1102 (such as parent product, an equivalent product, a substitute product, etc.). Each relatedProduct element 1102 includes a related product identification (ID) element 1104, a related product name element 1106, a related product number element 1108, and a related product typeCode element 1110 (example type codes are "parent", "equivalent", "substitute", etc.).

FIG. 12 illustrates some elements that contain information with respect to sales or business organizations that are authorized to sell the given product, according to certain embodiments. In FIG. 12, the product listOfRelatedBusUnit element 1200 includes a product relatedBusUnit element 1202 (one of the sales organizations that is authorized to sell the given product). The product relatedBusUnit element 1202 includes a product sales or business organization identifier (ID) element 1204, and a productBusUnitData element 1206 (contains information on the sales or business organization that is authorized to sell the given product). The productBusUnitData element 1206 is described in greater detail herein with reference to FIG. 15.

In FIG. 13, the relatedClass element 1300 includes a product related class identifier (ID) element 1302. The product related class element is part of the configuration data associated with the given product.

Figure 14:
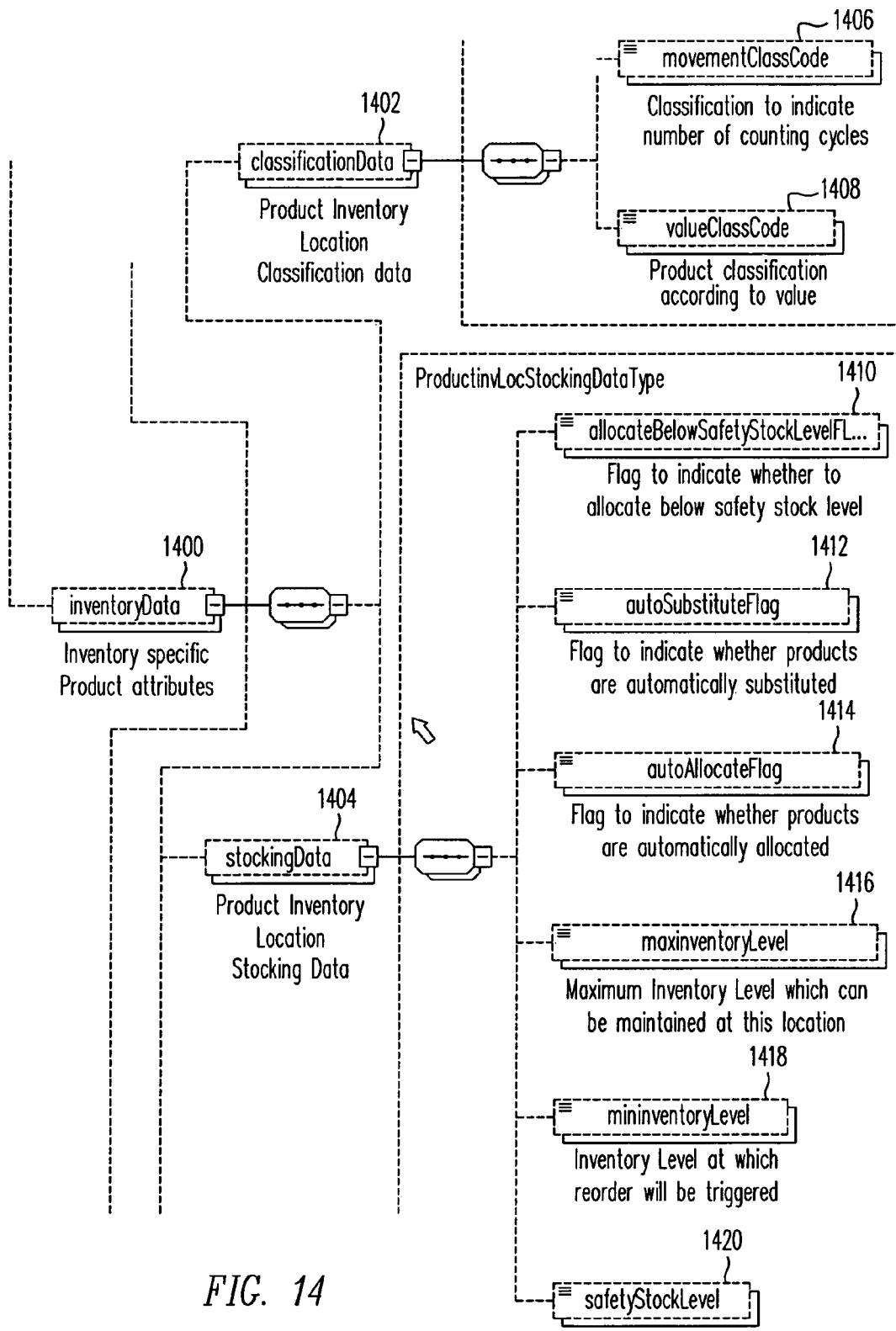

FIG. 14 illustrates some of the elements that describe attributes that are specific to the given product and that are specific to the inventory location for that given product, according to certain embodiments. In FIG. 14, product inventoryData element 1400 includes a product classificationData element 1402 (contains product inventory location classification data) and a product stockingData element 1404 (contains product inventory location stocking data). The product classificationData element 1402 includes a product movementClassCode element 1406 (i.e., classification code that indicates whether the given product is a slow moving product or a fast moving product as indicated by the number of counting cycles), and a product valueClassCode element 1408 (i.e., the given product is classified according to value, such as high value, medium value, low value, etc.).

Further, in FIG. 14, the product stockingData element 1404 includes a product allocateBelowSafetyStockLevelFlag element 1410 (such a flag indicates whether to allocate below the product safety stock level, in response to filling an order), a product autoSubstituteFlag element 1412 (such a flag indicates whether the given product is automatically substituted with another product when filling an order), a product autoAllocateFlag element 1414 (such a flag indicates whether the given product is automatically allocated), a product maxInventoryLevel element 1416 (indicates the maximum inventory level that can be maintained at the given inventory location with respect to the given product), a product minInventoryLevel element 1418 (indicates the minimum inventory level at which a re-stocking of the given product will be triggered at the given inventory location), and a product safetyStockLevel element 1420 (indicates the safe level at which the given product should be stocked at the given inventory location).

FIG. 15 illustrates some of the elements that contain information that is specific to a business or sales organization that is authorized to sell the given product, according to certain embodiments. In FIG. 15, productBusUnitData 1500 includes a product salesUnitOfMeasureCode element 1502, which is a sales unit of measure for the given product.

It will be appreciated by those skilled in the art that the above-described facility may be straightforwardly adapted or extended in various ways. For example, the facility may be used to transform various other kinds of inventory transaction information, and may be used to transform inventory transaction information between a variety of other formats.

In the foregoing specification, embodiments of the invention have been described with reference to numerous specific details that may vary from implementation to implementation. Thus, the sole and exclusive indicator of what the invention is, and what is intended by the applicants to be the invention, is the set of claims that issue from this application, in the specific form in which such claims issue, including any subsequent correction. Any express definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

We claim:

1. A non-transitory computer-readable storage medium, having encoded therein, a plurality of computer instructions comprising:
   a first set of computer instructions configured to define a data structure comprising a common set of fields, wherein
      each common field of the common set of fields corresponds to a source field in a source set of fields,
      a source data structure stored in a source system comprises the source set of fields,
      the each common field of the common set of fields further corresponds to a target field in a target set of fields,
      a target data structure stored in a target system comprises the target set of fields,
      at least one source field of the source set of fields is not among the common set of fields, and
      at least one target field of the target set of fields is not among the common set of fields;
   a second set of computer instructions configured to extract a source set of fields into the common set of fields, wherein
      the second set of instructions comprises
         a first subset of instructions configured to copy contents of each source field into a corresponding common field,
      the second set of instructions are configured to be executed by an integration server, and
      the contents of the source set of fields are extracted from a source system coupled to the integration server; and
   a third set computer instructions configured to synchronize the common set of fields to the target set of fields, wherein
      the third set of instructions comprises
         a second subset of instructions configured to copy contents of the each common field into a corresponding target field,
      the second set of instructions are configured to be executed by the integration server, and
      the contents of the common set of fields are synchronized to a target system coupled to the integration server.

2. The non-transitory computer-readable storage medium of claim 1, wherein data structure comprises a plurality of product elements includes comprising one or more elements selected from a group comprising:
   a product identifier,
   a product base data element,
   a product sales data element,
   a product configuration data element,
   a related product line element for defining a product line element,
   a product list of price type element for defining a plurality of product price type elements,
   a product list of related inventory location element for defining a plurality of product related inventory location elements for the product,
   a list of related product element for defining a plurality of related product elements,
   a product list of related business unit element for defining a product related business unit element, and
   a product custom data element.

3. The non-transitory computer-readable storage medium of claim 2, wherein the product base data element comprises one or more elements selected from a group comprising:
   a product category code element,
   a product description element,
   a product effective end date element for defining a product's effective validity end date,
   a product effective start date element for defining a product's effective validity start date,
   a global product identifier element,
   a global product classification code element,
   a global product serial identifier,
   a global product special handling code element,
   a product name element,
   a product number element,
   a product part number element,
   a product status code element,
   a product type code element,
   a product unit of measure code element, and
   a product vendor part serial number element.

4. The non-transitory computer-readable storage medium of claim 2, wherein the product sales data element comprises one or more elements selected from a group comprising:
   a product field replaceable flag,
   a product lead time element,
   a product maximum order quantity element,
   a product minimum order quantity element,
   a product revision number element,
   a product orderable flag,
   a sales product flag,
   a service product flag,
   a service instance flag, and
   a serialized product flag.

5. The non-transitory computer-readable storage medium of claim 2, wherein
   the product configuration data element comprises
      a product configuration flag, and
      a product related class element specific to a product;
   the product line element comprises a product line identifier,
a product line base data element, and
a product line custom data element, wherein
the product line base data element comprises:
a product line description element, and
a product line name element;
each of the plurality of product price type elements comprises
a product price type code element;
each of the plurality of product related inventory location elements for the product comprises
a product inventory location identifier, and
a product inventory data element for the product, wherein
the product inventory data element for the product comprises
one or more elements selected from:
a product inventory location classification data element, wherein the product inventory location classification data element includes comprises one or more elements selected from:
a product movement class code element,
a product value class code element, and
a product inventory location stocking data element, wherein
the product inventory location stocking data element comprises one or more elements selected from:
a product allocate below safety stock level flag,
a product auto substitute flag,
a product auto allocate flag,
a product maximum inventory level element
a product minimum inventory level element, and
a product safety stock level element;
each of the plurality of related product elements includes one or more elements selected from:
a related product identifier,
a related product name element,
a related product number element, and
a related product type code element; and
the product related business unit element comprises
a product organization identifier, and
a product business unit data element, wherein
the product business unit data element comprises
a product sales unit of measure code element.

6. The non-transitory computer-readable storage medium of claim 1, wherein
the product life cycle management comprises
managing service,
support information,
engineering information, and
manufacturing information.

* * * * *

UNITED STATES PATENT AND TRADEMARK OFFICE
CERTIFICATE OF CORRECTION

| | | |
|---|---|---|
| PATENT NO. | : 7,962,372 B2 | Page 1 of 1 |
| APPLICATION NO. | : 11/441499 | |
| DATED | : June 14, 2011 | |
| INVENTOR(S) | : Leon et al. | |

It is certified that error appears in the above-identified patent and that said Letters Patent is hereby corrected as shown below:

On sheet 5 of 10, in figure 6, Reference Numeral 602, line 1, delete "fieldReplacableFlag" and insert -- fieldReplaceableFlag --, therefor.

On sheet 5 of 10, in figure 6, Reference Numeral 602, line 2, delete "Replacable" and insert -- Replaceable --, therefor.

In column 5, line 65, delete "example:" and insert -- example. --, therefor.

In column 7, line 6, delete "enigine." and insert -- engine. --, therefor.

In column 7, line 42-43, delete "indentification" and insert -- identification --, therefor.

In column 10, line 10, in Claim 2, delete "wherein" and insert -- wherein the --, therefor.

In column 10, line 11, in Claim 2, after "elements" delete "includes".

In column 11, line 19, in Claim 5, after "element" delete "includes".

In column 12, line 4, in Claim 5, after "element" insert -- , --.

Signed and Sealed this
Tenth Day of April, 2012

David J. Kappos
*Director of the United States Patent and Trademark Office*